United States Patent [19]

Mirow

[11] Patent Number: 5,010,466
[45] Date of Patent: Apr. 23, 1991

[54] RESONANT MODE POWER SUPPLY WITH CONSTANT OUTPUT VOLTAGE

[76] Inventor: Fred Mirow, 2725 W. Country Club Rd., Philadelphia, Pa. 19131

[21] Appl. No.: 448,161

[22] Filed: Dec. 8, 1989

[51] Int. Cl.⁵ .......................................... H02M 3/355
[52] U.S. Cl. ...................................... 363/16; 363/21; 363/25; 363/97
[58] Field of Search ................. 363/16, 17, 21, 24, 363/25, 95, 98, 131-134

[56] References Cited

U.S. PATENT DOCUMENTS

| | | | |
|---|---|---|---|
| 4,525,774 | 6/1985 | Kino et al. | 363/17 |
| 4,563,731 | 1/1986 | Sato et al. | 363/17 |
| 4,791,542 | 12/1988 | Piaskowski | 363/17 |

Primary Examiner—Steven L. Stephan
Assistant Examiner—Emanuel T. Voeltz
Attorney, Agent, or Firm—Frank M. Linguiti

[57] ABSTRACT

A fixed frequency resonant mode DC to DC converter maintains a constant DC output voltage using a saturable inductor or saturable transformer in series with an inductor and capacitor. The output voltage of the converter is derived from the voltage drop across the saturable inductor or saturable transformer. The series inductor and capacitor force current through a switch to have a value of zero. The switch is then operated when the current through it is zero.

9 Claims, 2 Drawing Sheets

5,010,466

RESONANT MODE POWER SUPPLY WITH CONSTANT OUTPUT VOLTAGE

BACKGROUND OF THE INVENTION

This invention relates to DC to DC converters in which converter switching elements turn on and off when current through them is zero. In this class of converters, the output voltage is usually determined by either the current into a resonating capacitor in series with the transformer of the converter, or the voltage level across the series resonating capacitor. The values of the capacitor voltage and current vary as the input voltage varies causing the output voltage of the converter to also vary. To control the output voltage of the converter, the frequency at which the switching devices operate is varied. This complicates the control circuitry of the converter. Additionally, a more complicated DC output voltage filter is required. Further description of this class of converters can be found in U.S. Pat. No. 4,785,387, issued to Fred Lee.

SUMMARY OF THE INVENTION

A fixed frequency resonant mode converter for obtaining a nonvarying DC output voltage from an DC input signal has a switch for switching the input signal. The switch is controlled by a fixed frequency control signal. Additionally, the switch is adapted by the capacitive and inductive elements of the circuit to switch only during zero current flow through itself. A saturable transformer is in series with a capacitor to which the switched output signal is applied. The voltage drop across the saturable transformer is rectified and filtered to provide the DC output of the convertor.

DETAILED DESCRIPTION OF THE INVENTION

Figure 1:
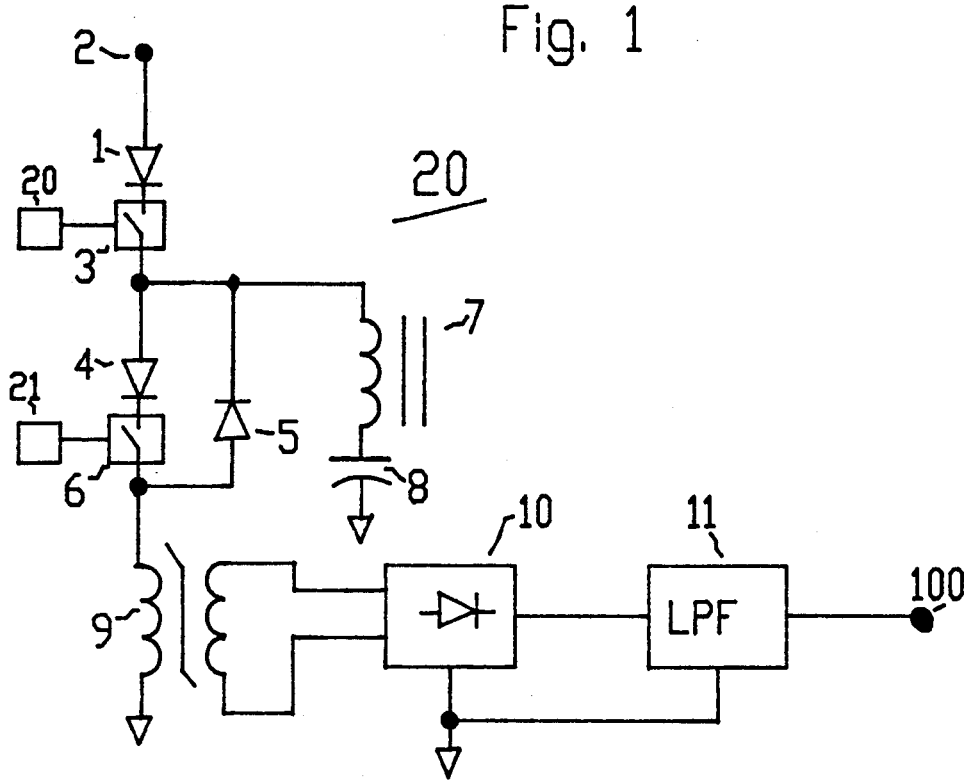
FIG. 1 is a schematic representation of the circuit of the present invention.
Figure 2:
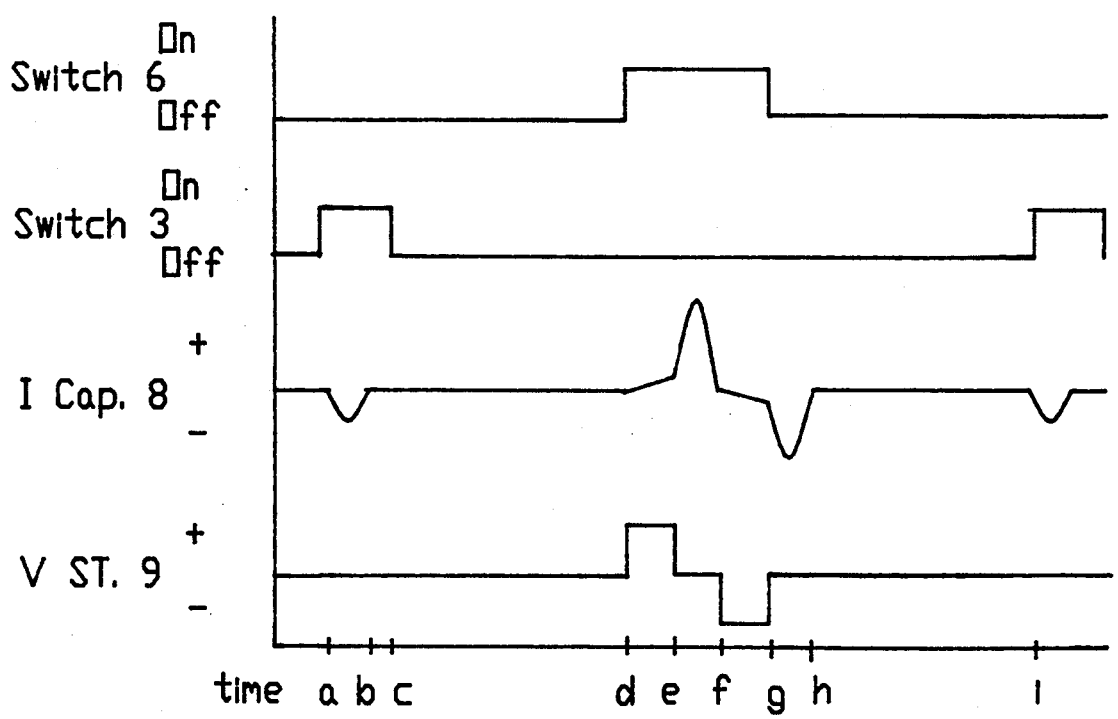
FIG. 2 is a graphical representation of the waveforms generated by of the circuit of FIG. 1.

Referring now to FIGS. 1, 2, there is shown DC to DC convertor 20 and various waveforms generated within DC to DC convertor 20. In particular, a full cycle of operation of converter 20 is shown between time a and time i. During the first half cycle of operation of convertor 20, switch 3 is turned on at time a, allowing the DC input voltage applied to terminal 2 to resonantly charge capacitor 8 through inductor 7 and diode 1. Capacitor 8 is fully charged at time b and the current through inductor 7 decreases to zero. Current through inductor 7 then remains at zero because reverse current is blocked by diode 1. Thus at time c no current flows through switch 3 and switch 3 is turned off by switch controller 20 which generates a fixed pulse width and frequency signal.

To start the next half cycle of operation of converter 20, switch 6 is turned on at time d by switch controller 21 which provides a fixed pulse and frequency signal for controlling the operation of switch 6. Turning timing switch 6 on allows capacitor 8 to resonantly discharge through inductor 7, saturable transformer 9, and diode 4. The current through inductor 7, capacitor 8 and saturable transformer 9 then reverses at time f and flows through diode 5. Diode 4 is reverse biased when current thus flows through diode 5, thereby preventing current through switch 6. Switch 6 is turned off between time f and time h by switch controller 21. When current through inductor 7, capacitor 8, and saturable transformer 9 reaches zero, the second half cycle of operation is over. The first half cycle of operation is then repeated when switch 3 is again turned on at time i.

A more detailed description of the operation of converter 20, including saturable transformer 9, is now given. During the second half cycle of operation, as current again begins through inductor 7, capacitor 8 and saturable transformer 9, saturable transformer 9 is not saturated at time d. When saturable transformer 9 is not saturated at time d, saturable transformer 9 is in a high impedance state. Saturable transformer 9 thus blocks a large percentage of the voltage to which capacitor 8, is charged. The inductance value of saturable transformer 9 is substantially greater than the inductance value of inductor 7 before saturable transformer 9 is saturated. When saturable transformer 9 is saturated the reverse is true.

The current level through saturable transformer 9 increases with time and, upon reaching a fixed current level at time e, saturable transformer 9 becomes saturated and switches to a low impedance state with only a small voltage drop across it. Inductor 7 then blocks the greater percentage of the voltage to which capacitor 8 is charged. Inductor 7 is used to limit the peak charge and discharge current levels through capacitor 8 and also to maintain the current level switch 3 and switch 6 at zero the instant switch 3 and switch 6 are turned on. Saturable transformer 9 remain in saturation until the level of current is less than a fixed value at time f, and remains out of saturation until the reverse current increases above a fixed level at time g.

As the current through saturable transformer 9 increases above a fixed level and then decreases below a fixed level, saturable transformer 9 goes into saturation and out of saturation. The integral of voltage with time of the voltage drop across saturable transformer 9 has a constant value for each time the current through it increase from zero to the saturation level. The voltage drop across saturable transformer 9 is applied to the secondary winding of saturable transformer 9. The secondary winding of saturable transformer 9 provides a stepped up or stepped down isolated voltage. If an isolated voltage is not needed saturable transformer may be replaced by a saturable inductor (not shown). The isolated voltage of the secondary of saturable transformer 9 is rectified by bridge rectifier 10 to obtain a pulsating DC voltage with a constant average value. The pulsating DC voltage thus obtained is applied to low pass filter 11 which removes the AC ripple voltage by blocking AC current and allows only the substantially ripple-free DC average voltage to be applied to output terminal 100.

Figure 3:
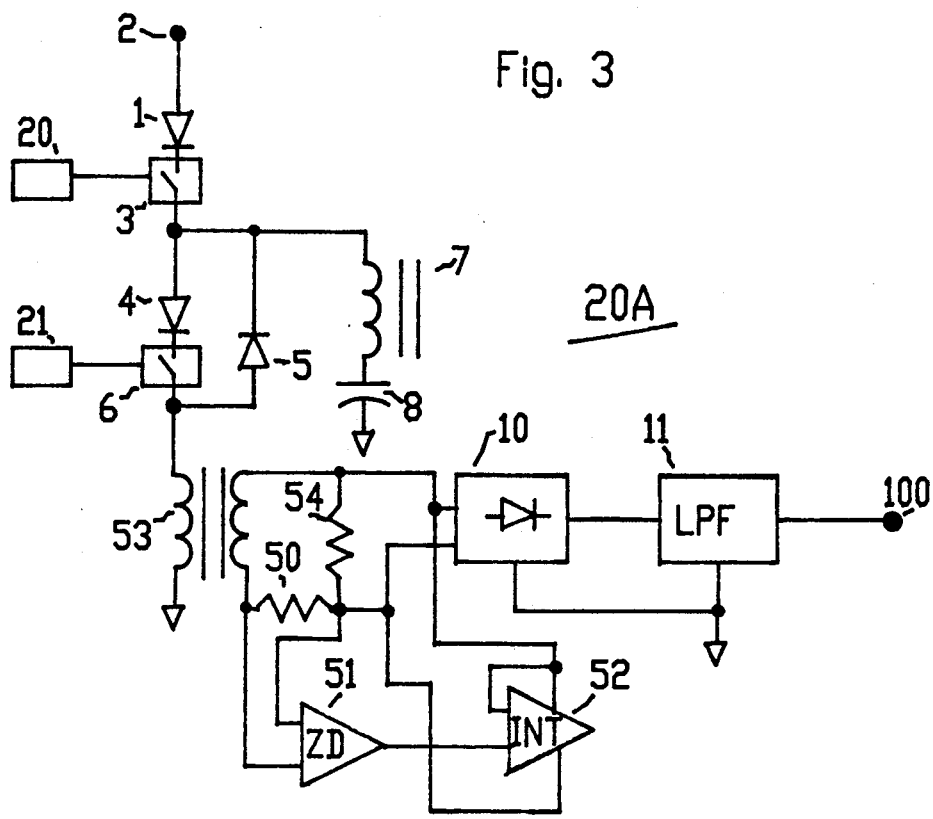
FIG. 3 is a schematic representation of an alternate embodiment of the circuit of FIG. 1.

Referring now to FIG. 3, converter 20a is shown. Converter 20a is an alternate embodiment of converter 20. Converter 20a uses linear transformer 53 and electronic circuitry to perform the function of saturable transformer 9 of converter 20. The electronic circuitry consists of a zero detector 51 and an integrator 52. The circuit operates by using integrator 52 to integrate each voltage pulse applied to bridge rectifier 10. Integrator 52, is a combination of a comparator, such as an IM311 having a built in switch, and a conventional RC network. When the voltage integral reaches a set value, integrator 52 shorts bridge rectifier 10 input. This short is removed when integrator 52 is reset by zero detector 51.

After integrator 52 is reset, the integration is repeated. Zero detector 51 applies a reset signal to integrator 52 when the voltage drop across resistor 50 is substantially zero. Resistor 50 has a low resistance value and is used to monitor the current through linear transformer 53. Resistor 54 has a high impedance value and is used to ensure that the current flow through resistor 50 is large enough to maintain correct operation of zero detector 51 independent of current flow out of terminal 100. Linear transformer 53 provides isolation and voltage level transformation and has a much higher inductance value than inductor 7.

Figure 4:
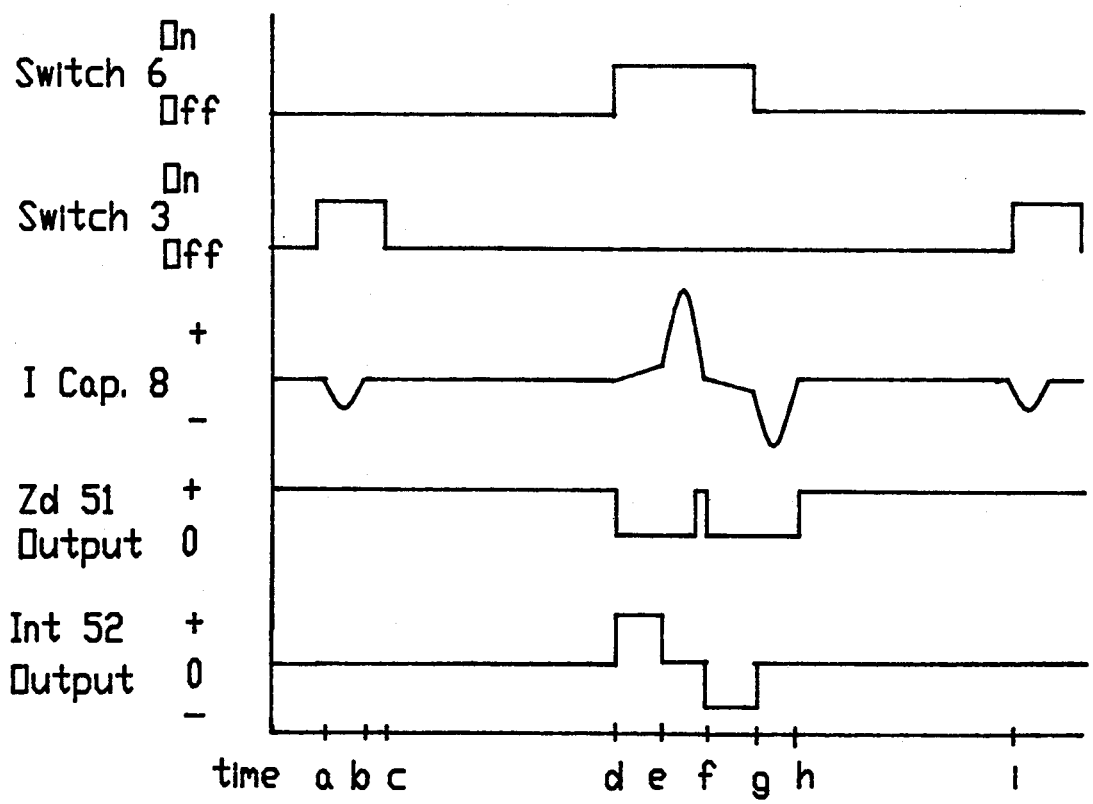
FIG. 4 is a graphical representation of the waveforms generated by the elements of the circuit of FIG. 3.

Referring now to FIG. 4, there is shown the various waveforms of converter 20a. A full operation cycle is shown in between time a and time i. During the first half cycle of operation of converter 20a, switch 3 is turned on at time a allowing the DC input voltage applied to terminal 2 to resonantly charge capacitor 8 through inductor 7 and diode 1. After capacitor 8 is charged at time b, the current flow decreases to zero and remains at zero since reverse current flow is blocked by diode 1. At time c no current is flowing through switch 3 and switch 3 is turned off by switch controller 20.

To start the next half cycle of operation, switch 6 is now turned on at time d by switch controller 21 allowing capacitor 8 to resonantly discharge through inductor 7, linear transformer 53, and diode 4. The output of zero detector 51 now goes low and integrator 52 begins integrating the voltage applied to bridge rectifier 10 input. At time e, integrator 52 shorts bridge rectifier 10 input and the current through capacitor 8 greatly increases. The current flow then passes through the zero level and reverses at time f causing zero detector 51 to apply a short reset pulse to integrator 52. Integrator 52 then begins a new integration. The current from capacitor 8 now flows through diode 5. Diode 4 is then reversed and prevents current through switch 6. Switch 6 is turned off between time f and time h by switch controller 21. At time g, integrator 52 shorts bridge rectifier 10 input and at this time the current through capacitor 8 greatly increases. When the current reaches zero the second half cycle of operation is over. The first half cycle is then repeated when switch 3 is again turned on at time i.

The voltage at the input of bridge rectifier 10 is rectified to obtain a pulsating DC voltage with a constant average value. The pulsating DC voltage is applied to low pass filter 11 which removes the AC ripple voltage by blocking AC current and allowing only the average voltage, which is substantially ripple free DC voltage, to be received at output terminal 100.

Within convertor 20 and converter 20a, the DC output voltage of output terminal 100 may be changed by varying the frequency at which convertor 20 is operated. Also, within converter 20 the DC output voltage may be changed by varying the level at which saturable transformer 9 saturates. The saturation level of saturable transformer 9 may be varied by the addition of control windings to saturable transformer 9, to which a DC control current is supplied.

Although the above description has been directed to preferred embodiments of the invention, it will be understood and appreciated by those skilled in the art that other variations and modifications may be made without departing from the spirit and scope of the invention, and therefore the invention includes the full range of equivalents of the features and aspects set forth in the appended claims.

I claim:

1. A resonant mode converter for obtaining a DC output voltage comprising;
    a transformer;
    switch means electrically coupled to said transformer for controlling the frequency at which a capacitor is charged and discharged,
    said switch means adapted to switch only during zero current through said switch means,
    means for rectifying a transformer signal across said transformer to obtain a pulsating DC voltage,
    means for integrating said transformer signal to determine a rectifier input integral value,
    means for shorting an input of said rectifying means in accordance with said rectifier input integral value; and,
    means for filtering the pulsating DC voltage to provide a substantially ripple-free DC output signal.

2. The resonant mode converter of claim 1, further comprising switch control means for producing a switch control signal wherein said switch for controlling the charging and discharging frequency of said capacitor controls the charging and discharging frequency of said capacitor in accordance with said switch control signal.

3. The resonant mode converter of claim 2, wherein said switch control means comprises an oscillator.

4. The resonant mode converter of claim 3, wherein said oscillator comprises a oscillator having a variable frequency output.

5. The resonant mode oscillation of claim 4, comprising means for controlling the level of said DC output signal in accordance with said variable frequency output.

6. The resonant mode oscillator of claim 1, wherein said means for integrating comprises means for providing an integrator output signal when the integration level of said means for integrating reaches a set value.

7. The resonant mode convertor of claim 6, wherein said set value is variable.

8. The resonant mode converter of claim 6, wherein said switch means shorts said rectifier input in accordance with said integrator output signal.

9. The resonant mode converter of claim 7, further comprising means for controlling the level of said DC output signal in accordance with said set value.

* * * * *